(12) United States Patent
Savard et al.

(10) Patent No.: US 6,568,350 B1
(45) Date of Patent: May 27, 2003

(54) MODULAR ANIMAL BOARDING SYSTEM

(75) Inventors: Homer F. Savard, Cave Creek, AZ (US); Daniel E. Blackburn, Hillsboro, OH (US); Gary Silvis, Sardinia, OH (US)

(73) Assignee: The Mason Company, Leesburg, OH (US)

( * ) Notice: Subject to any disclaimer, the term of this patent is extended or adjusted under 35 U.S.C. 154(b) by 0 days.

(21) Appl. No.: 10/153,488

(22) Filed: May 22, 2002

(51) Int. Cl.$^7$ .............................. A01K 1/02; A01K 1/01
(52) U.S. Cl. ..................................... 119/458; 119/502
(58) Field of Search ................... 119/502, 455, 119/458, 482, 483, 702, 703; 52/79.13, 579

(56) References Cited

U.S. PATENT DOCUMENTS

| | | |
|---|---|---|
| 3,087,458 A | 4/1963 | Bennett, Jr. |
| 3,254,627 A | 6/1966 | Cross .......................... 119/17 |
| 3,550,558 A | 12/1970 | Sachs .......................... 119/15 |
| 3,662,713 A | 5/1972 | Sachs .......................... 119/18 |
| 3,726,254 A | 4/1973 | Conover ..................... 119/16 |
| 3,768,442 A | 10/1973 | Van Huis ..................... 119/18 |
| 3,911,634 A | 10/1975 | Horowitz et al. .............. 52/79 |
| 3,951,106 A * | 4/1976 | Wright ....................... 119/482 |
| RE31,556 E * | 4/1984 | Buchanan .................. 119/436 |
| 4,794,879 A | 1/1989 | Thom et al. .................. 119/17 |
| 5,116,256 A | 5/1992 | Allen .......................... 119/17 |
| 5,174,241 A | 12/1992 | Goguen et al. ............... 119/15 |
| 5,220,882 A | 6/1993 | Jenkins ....................... 119/17 |
| 5,473,845 A | 12/1995 | Livingston et al. .......... 52/79.9 |
| 5,476,066 A | 12/1995 | Hoffman ..................... 119/19 |
| 5,482,005 A | 1/1996 | Thom ......................... 119/17 |
| 5,749,321 A | 5/1998 | Ikuse et al. ................. 119/458 |
| D399,609 S | 10/1998 | Allen et al. ................. D30/108 |
| 6,021,739 A | 2/2000 | Allen ......................... 119/458 |
| 6,152,080 A | 11/2000 | Allen ......................... 119/452 |

FOREIGN PATENT DOCUMENTS

DE    3842638 C1 *  7/1990  ............ A01K/1/03

* cited by examiner

Primary Examiner—Peter M. Poon
Assistant Examiner—Son T. Nguyen
(74) Attorney, Agent, or Firm—Wood, Herron & Evans, LLP

(57) ABSTRACT

A modular, double-height animal boarding system which can be installed inside a building having limited headroom while permitting persons up to six feet in height to enter lower runs without stooping. The boarding system has a lower section divided into plural lower runs, each lower run having a rear wall and a door that opens outwardly away from the rear wall. At least one upper section is supported above the lower section and is divided into plural upper runs. The upper runs have doors that open onto a catwalk. The upper sections are provided with a plumbing system so that each upper run has a drain through which waste can be washed, the waste from each run then draining into a single drainpipe, and, thereafter, draining into a floor gutter connected to any suitable waste collection system. The upper runs have floors which are sealed against leakage of liquid material to the lower runs by a floor seal provided around the perimeter of the floors.

17 Claims, 7 Drawing Sheets

MODULAR ANIMAL BOARDING SYSTEM

FIELD OF THE INVENTION

This invention relates to animal kennels. More specifically, this invention relates to a modular animal kennel boarding system.

BACKGROUND OF THE INVENTION

Animal boarding systems known in the art have a number of drawbacks that impact negatively on both the user and the animal boarder. Traditional boarding systems tend to be constructed from monolithic units which require large areas of floor space, and if used indoors, specialized single use buildings to accommodate the kennels.

Animal boarding systems with these problems are shown in U.S. Pat. Nos. 3,662,713; and 3,087,458. The '713 patent discloses a boarding system made of discrete monolithic animal runs that are stacked one on top of another. The kennel system of the '458 patent also uses discrete runs of singular construction. Because each run of the boarding systems in these patents is an autonomous unit, a kennel constructed from these runs is difficult and time consuming to assemble as well as to move from location to location or rearrange withing a single location.

Also, traditional kennel systems tend to be problematic to clean. When animal boarders are confined for any appreciable length of time each animal run needs to be washed of the boarder's waste on a regular basis in order to prevent spread of disease from animal to animal and ensure a safe and comfortable environment for the animal as well as for those who maintain an animal boarding system. In the traditional boarding systems, usually either an animal boarder must be removed from its respective animal run so the user may clean, or the user must clean around an animal, potentially to that animal's discomfort, e.g., if an animal run is washed with a hose the animal may get wet, or such a cleaning may be dangerous to the user, e.g., if a temperamental animal must be removed from its run during cleaning, the user is placed in direct contact with the unfriendly animal and susceptible to biting or other injury.

Furthermore, traditional kennel systems generally have not succeeded in addressing how to gain access to a run as easily as possible for both the user and the animal boarder, particularly if the boarding system has plural levels of animal runs as required to minimize floor space for indoor boarding. These stacked animal run systems have in the past had kennel doorways on the upper runs that simply opened into space above the lower runs so that a user or attendant had to physically lift an animal boarder up off the floor and into the run or down from the kennel to the floor. As mentioned above, whenever a user comes into direct contact with an unfriendly animal, the attendant is put at risk to personal bodily harm and even if the animal is friendly, the attendant is subject to back injury from the lifting.

Also, traditional boarding systems often have more than one animal run sharing a common doorway. Again, this potentially puts a user in harm's way when coming into contact with more than one animal in order to fetch a single animal. When multiple animal runs have one common entrance cleaning the multiple runs also becomes more difficult. The animal boarders occupying a first run must be moved into an adjacent run, which shares the common entrance so that a user may clean the first run, and then the animal boarders must be moved back into the first run in order for the user to clean out the second run. Of course, the problem is further exacerbated when more than two animal runs share a common entrance.

U.S. Pat. No. 6,021,739 to Allen, commonly held by the Assignee of the present invention and incorporated by reference herein in its entirety, discloses a modular animal boarding system comprising plural rows of upper and lower kennel runs and which addresses the drawbacks of prior boarding systems described above. Commonly held co-pending U.S. application Ser. No. 10/060,115, filed on Jan. 29, 2002 and incorporated by reference herein in its entirety, describes a kennel system having only a single row of upper and lower kennel runs. In some applications, however, height limitations prevent the use of full-height upper and lower kennels, whether of single or multiple row construction, thereby making it unfeasible or cost prohibitive to utilize the space for boarding animals. There is thus a need for a modular animal boarding system which addresses the aforementioned drawbacks of existing systems and which further provides a double-stacked kennel system which may be installed in a limited height environment.

OBJECTIVES OF THE INVENTION

It is therefore an object of the present invention to provide a modular animal boarding system having an upper modular section opening onto a catwalk, the upper modular section and catwalk being supported above a lower modular section.

It is another object of the present invention to provide a modular animal boarding system that may be constructed indoors in very nearly any multiple purpose building so long as the building has adequate floor area and sound proofing.

It is a further object of the present invention to provide a modular animal boarding system with upper and lower modular sections subdivided into distinct animal runs, each animal run having a waste collection drain that empties into a suitable waste collection system.

It is also an object of the present invention to provide a modular animal boarding system with plural animal runs, each animal run having a foldable bench that allows a user to easily wash clean a run while an animal remains in the run.

SUMMARY OF THE INVENTION

The preceding objectives are accomplished with the present inventive modular animal boarding system having a multiple run lower section and a multiple run upper section that may be quickly erected at any desired location having access to an adequate waste collection system.

The upper section is supported above the lower section by a support frame. The lower section is subdivided into plural lower runs, each lower run having a common rear wall. Each lower run has its own doorway to provide access to an animal boarder, the doorway opening away from its rear wall. The upper sections are comprised of discrete upper runs, each run having a door that opens generally toward a common catwalk. Each upper run also has a drain in fluid communication with a plumbing system so that a user may wash out the upper run of animal waste. Each upper run drain is in fluid communication with a common drain pipe that empties into a gutter defined in the floor of any suitable location having access to an adequate waste collection system. Each upper and lower run may have a foldable bench that the animal boarder can be quickly conditioned to jump onto when a user hoses off the run's floor. A user may also fold the bench up against the run's rear wall to allow a thorough cleaning of the run while the run is unoccupied as well as to gain access to a drain located beneath the bench.

The upper runs open generally toward the catwalk that the user and animal boarder use to access the upper runs. The catwalk is accessed by a staircase having a landing plate with a gutter in fluid communication with the drain pipe so that a user may clean the catwalk of any animal waste, and that waste may drain into the drain pipe, into the floor gutter, and thereafter into the waste collection system.

The upper and lower sections may have single or multiple rows of kennel runs and the entire system is constructed to have a combined height of not more than about 12 feet to permit installation in facilities with limited headroom. Because the lower and upper sections are constructed from distinct modular parts, i.e., each run is not monolithic, the boarding system is easily locateable and quickly constructed at any suitable desired location.

The features and objectives of the present inventive modular animal boarding system will become more readily apparent from the following Detailed Description taken in conjunction with the accompanying drawings.

DETAILED DESCRIPTION OF THE PREFERRED EMBODIMENT

Figure 1:
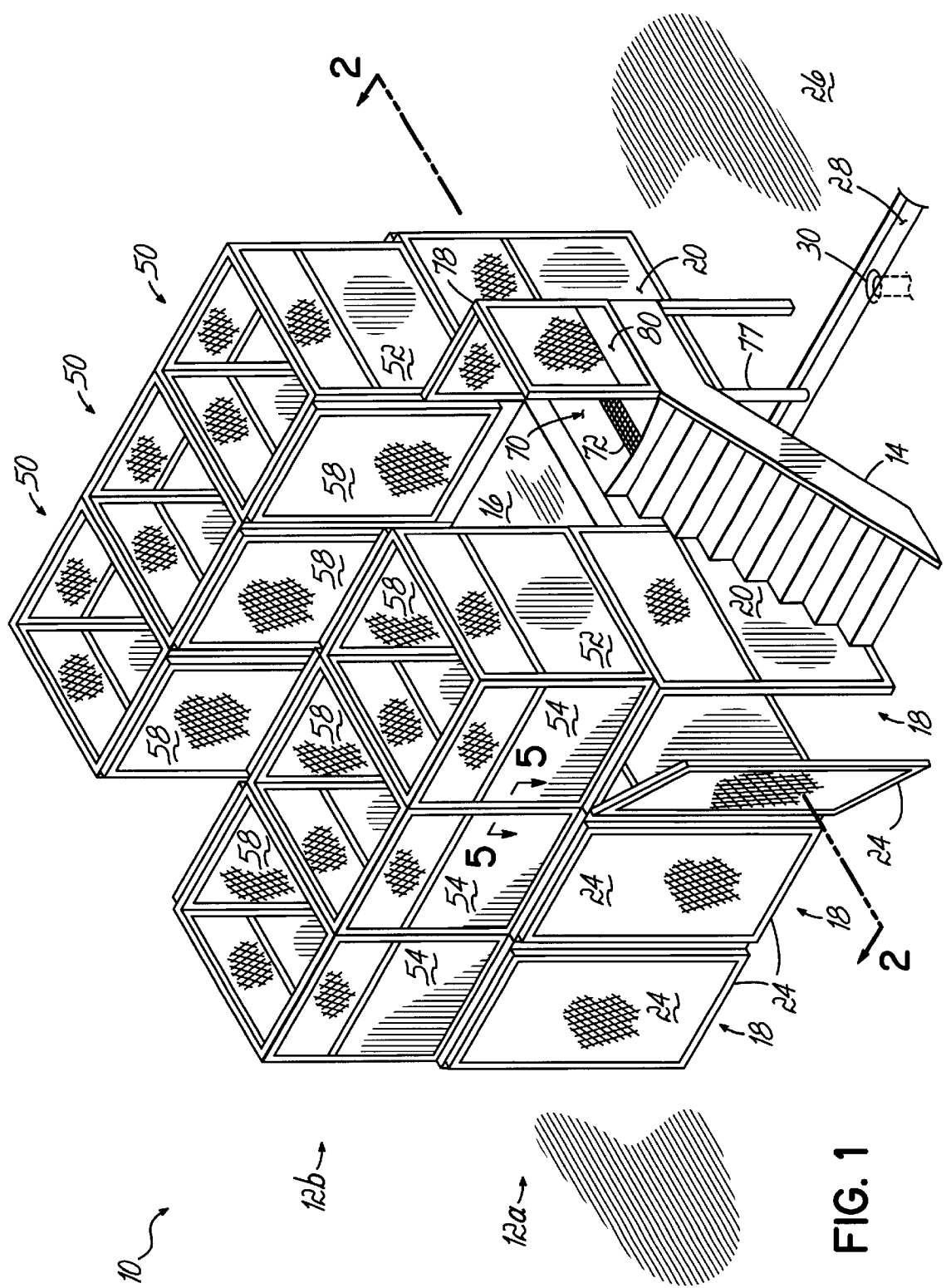
FIG. 1 is a perspective view of an exemplary modular animal boarding system of the present invention.

As seen in FIG. 1, an exemplary modular boarding system 10 has a lower section 12a and an upper section 12b, each section having multiple rows of discrete kennel runs for containing animal boarders. The upper section 12b is supported above the lower section 12a and is accessed by a set of stairs 14 and a catwalk 16.

Figure 2:
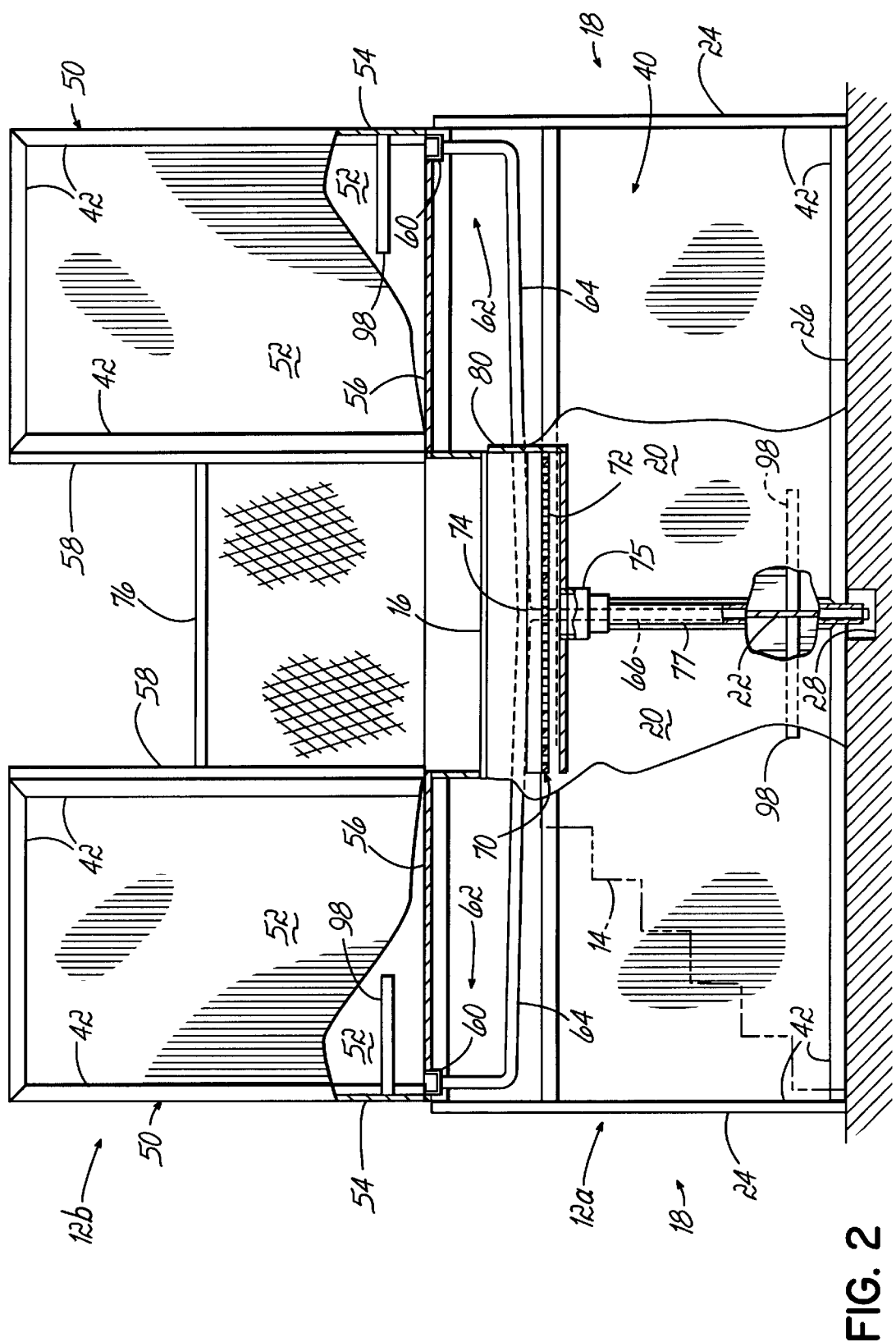
FIG. 2 is a section view taken along line 2—2 of FIG. 1.
Figure 3:
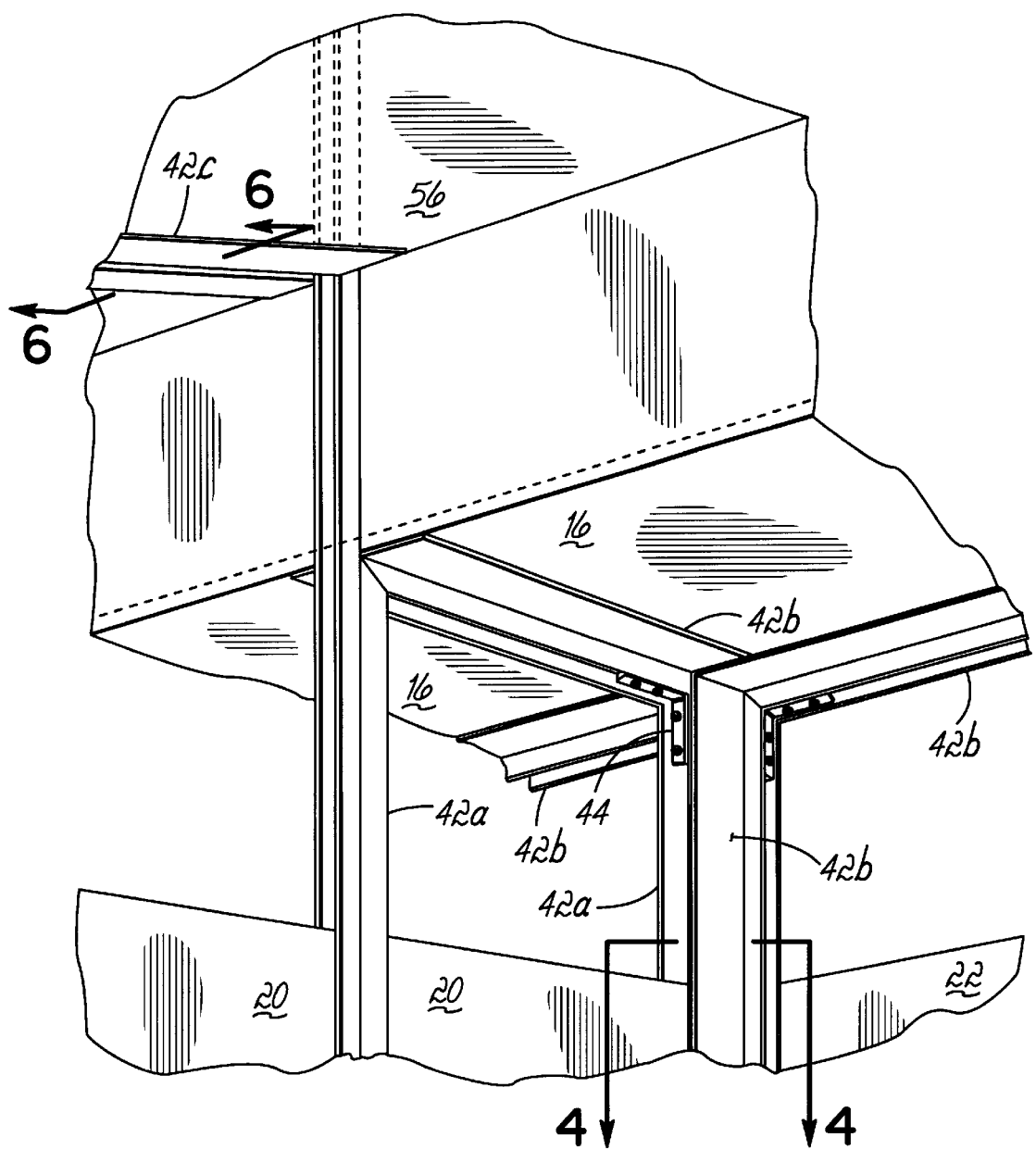
FIG. 3 is a partial perspective view depicting the interior support structure of the system of FIG. 1.
Figure 4:
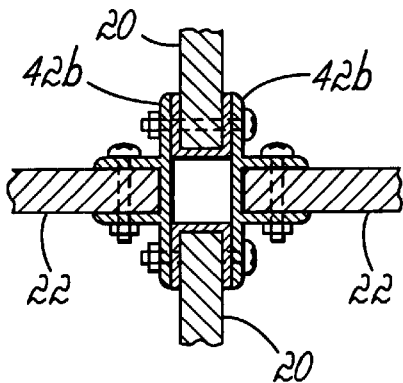
FIG. 4 is a section view taken along line 4—4 of FIG. 3.
Figure 5:
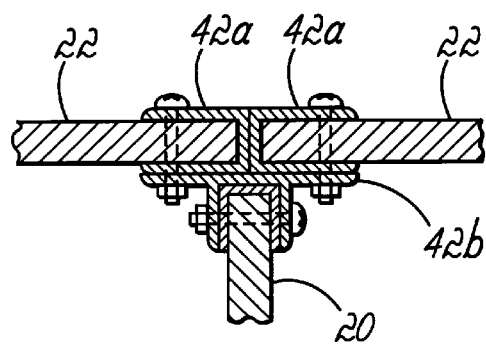
FIG. 5 is a section view of taken along line 5—5 of FIG. 1.

Referring to FIGS. 1–2, each lower section kennel run 18 includes side walls 20, a rear wall 22, and a door 24. The side walls 20 and rear walls 22 are constructed from fiber reinforced plastic panels, as described in commonly held U.S. Pat. No. 6,021,739 to Allen, and joined by framing members as described in commonly held U.S. Pat. No. 6,152,080 to Allen, both herein incorporated by referenced in their entirety. The doors 24 of the lower section 12a are generally positioned opposite the rear walls 22 and open outwardly with respect to the rear walls 22. Adjacent lower kennel runs 18 may share a single, common side wall 20 and the rows of the lower section 12a are arranged back-to-back such that oppositely disposed lower runs 18 share a common lower rear wall 22. The side walls 20 and rear walls 22 may be entirely comprised of fiber reinforced plastic panels, or a portion of the walls 20, 22 may be left open or made with a mesh material to allow ventilation of individual kennel runs 18. In the exemplary embodiment shown, the doors 24 to the kennel runs 18 are made from chainlink fencing, however, the door 24 may be made from any suitable material which may be used to retain an animal boarder within the runs, such as fiber reinforced plastic, plexiglass, or glass panels.

The lower kennel runs 18 may sit directly on a floor in any desired location having access to a suitable waste collection system. Alternatively, the lower kennel runs 18 may be provided with floor panels. In the exemplary embodiment shown, the lower kennel runs 18 sit directly on the floor 26 and a floor gutter 28 near the rear, walls 22 of the lower kennel runs 18 is provided so that waste may be washed from the lower kennel runs 18 and into the floor gutter 28. The floor gutter 28 empties into a floor drain 30 which is in communication with the waste collection system (not shown).

While the floor gutter 28 has been shown located near the rear walls 22 of the lower kennel runs 18, one skilled in the art will recognize that the floor gutter 28 may be located at other locations. The floor 26 is typically sloped in a direction toward the floor gutter 28 to facilitate the washing of waste material into the floor gutter 28. The lower kennel run side walls 20 are attached to the floor using a panel leveling system as described in commonly held U.S. Pat. No. 6,152,080, to Allen, to provide proper orientation of the wall panels 20 on the sloped floor 26 and to seal individual kennel runs 18 from cross-contamination.

The upper section 12b is supported above the lower section 12a by a support structure 40 comprising the lower section rear walls 22 and sides walls 20, together with exemplary framing members 42a, 42b, 42c, as depicted in FIGS. 3–6. The framing members 42 are joined to the wall panels 20, 22 by suitable fasteners and may be reinforced with brackets 44. It will be understood by those skilled in the art that there are many possible ways to join wall panels 20, 22 and exemplary framing members 42a, 42b, and 42c are provided to depict one possible configuration. In the exemplary embodiment shown herein, the exemplary framing members 42 are aluminum extrusions, however it is understood that framing members 42 may be fabricated from other materials and methods, such as castings or welded sections. Accordingly, the present animal boarding system 10 provides an improvement over the system disclosed in U.S. Pat. No. 6,021,739 to Allen in that the present animal boarding system 10 does not require additional vertical columns or transverse beams supported on those columns to support the upper section 12b.

Referring to FIGS. 1 and 2, the upper section 12b comprises at least one row of discrete kennel runs 50 positioned adjacent one another. Each upper run 50 has upper side walls 52 an upper rear wall 54 and a floor 56 received upon the support structure 40. The floor 56 may be reinforced by transverse channel sections (not shown) fastened to the framing members 42 of the supporting structure 40. The upper runs 50 further include upper doors 58 which open outwardly with respect to the upper rear walls 54, and onto a common catwalk 16. The upper side walls 52 and rear walls 54 are made from fiber reinforced plastic panels, as described above for the lower kennel runs 18. The upper doors 58 are depicted as comprising chain link fencing, but may be constructed from other suitable materials, as described above for the lower doors 24.

As shown in FIG. 2, the floors 56 of each upper run 50 are provided with a floor drain 60 generally located near the rear wall 54 of the upper run 50. The floors 56 of the upper runs 50 may be sloped in a direction toward the floor drain 60 to facilitate the removal of waste material from the upper runs 50 through the floor drain 60. The floor drains 60 of the upper runs 50 are connected to a plumbing system 62 which is in fluid communication with the floor gutter 28. In the exemplary embodiment shown, the floor drains 60 are connected to at least one feeder pipe 64 and a drain pipe 66 which directs waste material to the floor gutter 28. The feeder pipe 64 slopes downwardly away from the floor drain 60 of the upper runs 50 and toward the drain pipe 66. The floor drains 60 of multiple upper kennel runs 50 may be connected to a single, common feeder pipe 64.

Upper kennel runs 50 open onto a common catwalk 16 which is supported above the lower kennel runs 18 by the support structure 40. In the exemplary embodiment shown, the catwalk 16 comprises high density foam panels having poly-coated aluminum skin surfaces and aluminum skin undersides. This same material is used for the floors 56 of the upper kennel runs 50 and may optionally be used as floors for the lower kennel runs 18. The catwalk 16 is accessed by a set of stairs 14 and a landing plate 70. The landing plate 70 includes a landing plate gutter 72 which is in fluid communication with the waste collection system. The floor 74 of the landing plate 70 is sloped in a direction toward the landing plate gutter 72 to facilitate the washing of waste material into the gutter 72. Any waste which spills onto the catwalk 16 may be washed onto the landing plate 70 and into the landing plate gutter 72 to the waste collection system.

In the exemplary embodiment shown, the landing plate 70 is provided at a height which is lower than the height of the catwalk 16, whereby users and animal boarders must step up onto the catwalk 16 from the landing plate 70. In an exemplary embodiment, the step up to the-catwalk is not greater than approximately 8 inches. The landing plate gutter 72 is coupled to a landing plate drain 75 and landing plate feeder pipe 77 to channel waste to the floor gutter 28 and eventually to the floor drain 30. The catwalk 16 and stairs 14 may be provided with railing 76, 78 to ensure the safety of animal boarders and users of the kennel system 10. The catwalk 16 and landing plate 70 may further be provided with splash plates 80 to prevent the leakage of waste material or other fluids over the edge of the catwalk 16 and landing plate 70.

Figure 6:
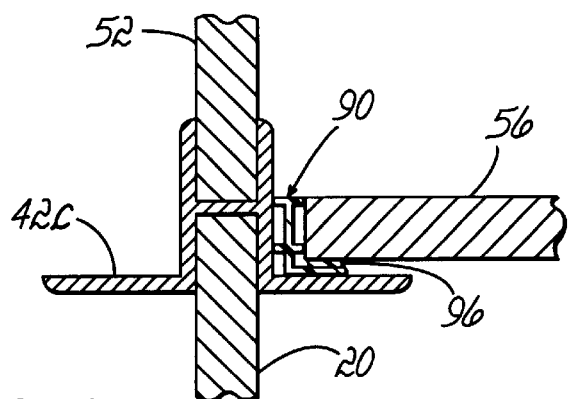
FIG. 6 a cross-sectional view taken along line 6—6 of FIG. 3, depicting a joint of upper and lower wall panels and an upper floor panel, together with an exemplary floor seal.
Figure 7:
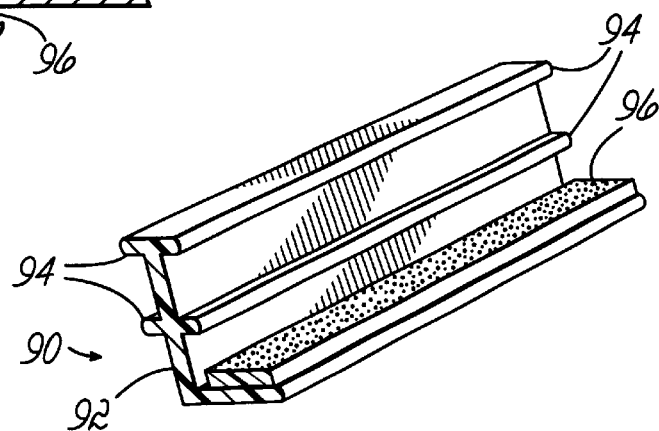
FIG. 7 is a perspective view of the exemplary floor seal of FIG. 6.

In an exemplary embodiment shown in FIG. 6, the floor panels 56 of the upper kennel runs 50 are sealed against leakage of waste material and other liquids by a floor seal 90 provided between the framing members 42c of the support structure 40 and the floor panel 56. Referring to FIG. 7, an exemplary floor seal 90 includes a relatively rigid angle member 92 and at least one flexible sealing member 94. The angle member 92 may be made from polyvinylchloride, or other suitable material. The sealing members 94 are made from a material having a softer durometer than the angle member 92. In the exemplary embodiment shown, the angle member 92 and the sealing members 94 are co-extruded to form a unitary floor seal 90.

The floor seal 90 may be attached to the perimeter of a floor panel 56 prior to installation into the upper kennel run 50. In the exemplary embodiment shown, the angle member 92 is an L-shaped extrusion. A double-sided adhesive tape 96 is provided on one leg of the extrusion and the other leg includes co-extruded sealing members 94 provided on opposing sides of the leg. When applied to the floor panel 56, the double-sided adhesive tape 96 secures the floor seal 90 to the floor panel 56 and the co-extruded sealing members 94 seal against the peripheral edge of the floor panel 56 and the framing member 42c supporting the floor panel 56.

The upper and lower kennel runs 18, 50 may be provided with benches 98 pivotally attached to their rear walls 22, 54 and suspended above the floor gutter 28 or upper floor drains 60, as shown in FIG. 2. The benches 98 provide a support surface for the animal boarder and permit the washing of kennel runs 18, 50 with an animal boarder present in the run. The benches 98 may be raised to permit access to the floor gutter 28 and upper floor drains 60 for service or to permit more thorough cleaning of the kennel runs 18, 50.

Figure 8:
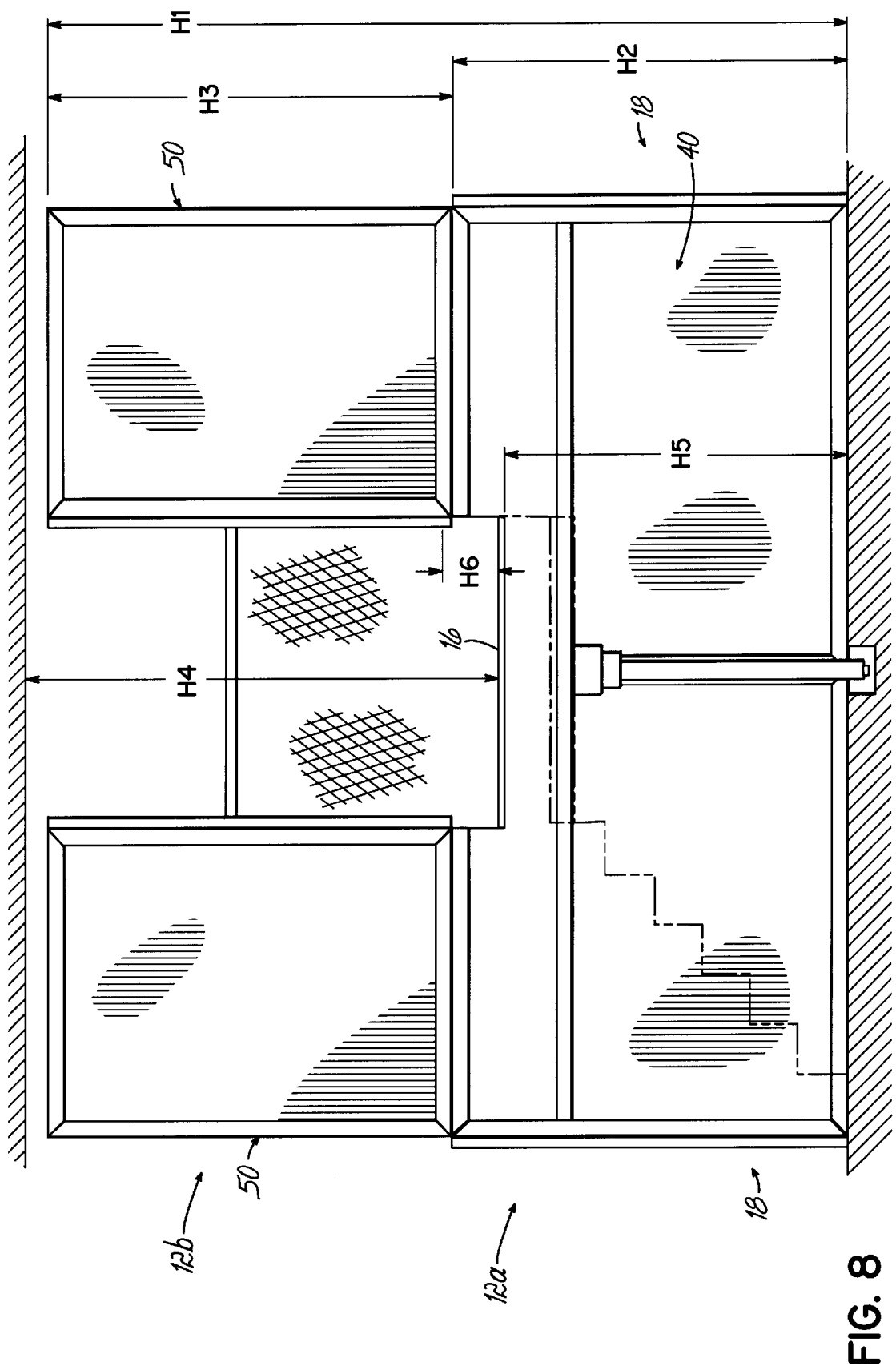
FIG. 8 is a partial end view of the system of FIG. 1, similar to FIG. 2, but showing various height dimensions.

FIG. 8 shows a partial end view of the exemplary modular animal boarding system 10 of FIG. 1. The combined height H1 of the lower and upper kennel runs 18, 50 is not greater than approximately twelve feet to enable the boarding system to be installed in a building with limited interior ceiling clearance. In an exemplary embodiment, the lower section 12a has a height H2 which is not more than approximately 75 inches and the upper section 12b has a height H3 which is not more than approximately 60 inches. The catwalk 16 is constructed to provide at least approximately 74 inches of headroom. This configuration permits persons up to approximately six feet in height to enter the lower kennel runs 18 and to walk along the catwalk 16 without stooping.

Portions of the lower runs 18 immediately beneath the catwalk 16 have an interior height H5, which is less than the maximum height H2 of the remaining portions of the runs 18, and the catwalk 16 is supported above these lower portions to provide the desired headroom H4 above the catwalk 16. Accordingly, upper runs 50 are accessed from the catwalk 16 by stepping up into the runs 50 from the catwalk 16. In an exemplary embodiment, the height difference H6 between the catwalk 16 and the floors 56 of the upper runs 50 was approximately 15 inches.

Figure 9:
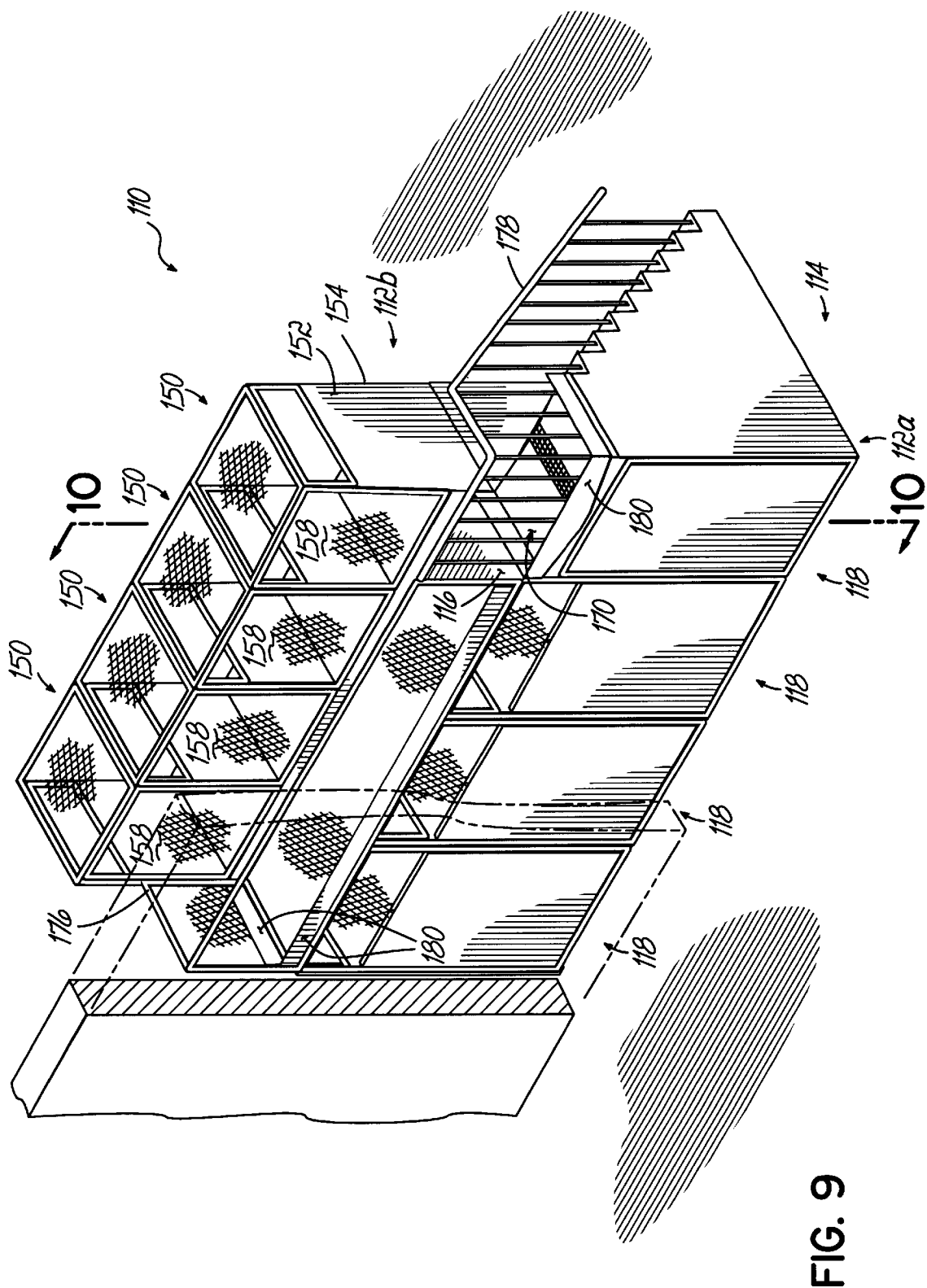
FIG. 9 is a perspective view of second exemplary modular animal boarding system of the present invention.
Figure 10:
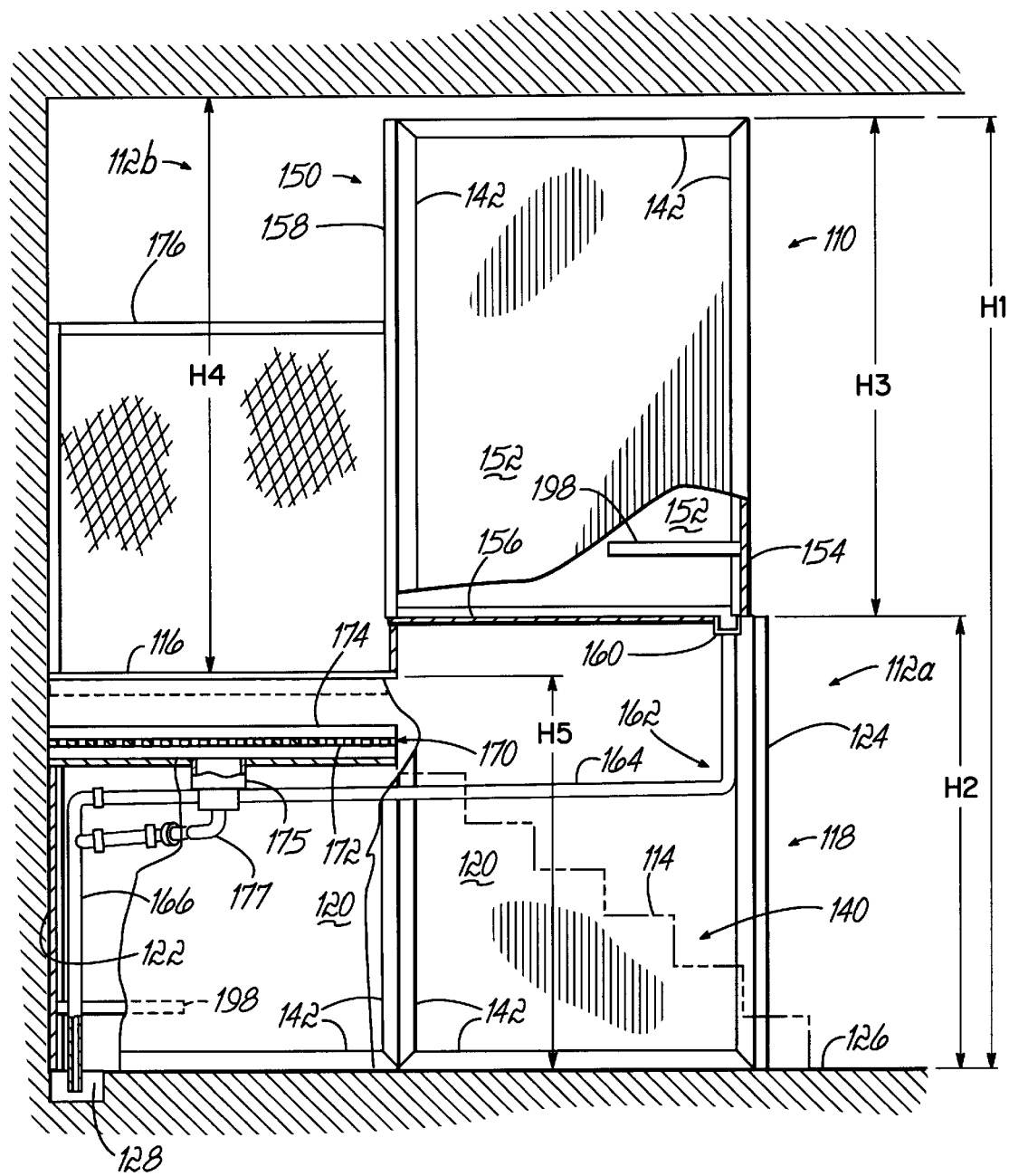
FIG. 10 is a section view of the system of FIG. 9, taken along line 10—10.

Referring to FIGS. 9 and 10, there is shown another exemplary boarding system 110 having single rows of upper and lower kennel runs, the construction of which is more fully described in co-pending U.S. application Ser. No. 10/060,115, assigned to the assignee of the present invention. The components of boarding system 110 are similar to the components of boarding system 10 and are similarly numbered, beginning with 110. The boarding system 110 includes lower and upper sections 112a, 112b, each having a single row of multiple kennel runs 118, 150 and a plumbing system 162, as described above for the multiple row boarding system 10. The upper and lower kennel runs 118, 150 are constructed from modular wall panels and doors and the upper section 112b is supported above the lower section 112a by a support structure 140, as described above. The lower and upper kennels 118, 150 may be provided with benches 198 pivotally attached to their respective rear walls 122, 154, as described above.

The upper kennel runs 150 have doors 158 which open onto a catwalk 116 which, together with a set of stairs 114 and a landing plate 170, provide access to the upper runs 150. The landing plate 170 includes a landing plate gutter 172 which is in fluid communication with the waste collection system, whereby animal waste may be removed from the catwalk 116.

The upper kennel runs 150 have floors 156 with drains 160 located near the upper rear walls 154. The drains 160 are connected by a plumbing system 162 to the waste collection system whereby waste may be washed from individual kennel runs 150. In an exemplary embodiment, the drain 160 of each upper run 150 is connected by a feeder pipe 164 to a drain pipe 166 in communication with the waste collection system. The feeder pipe 164 is generally oriented to slope toward the drain pipe 166.

Referring to FIG. 10, the combined height H1 of the lower and upper runs 118, 150 is not more than approximately twelve feet. In an exemplary embodiment, the lower section 112a has a height H2 which is not more than approximately 75 inches and the upper section 112b has a height H3 which is not more than approximately 60 inches. The catwalk 116 is constructed to provide at least approximately 74 inches of headroom. Accordingly, persons up to approximately six feet in height may enter the lower runs 118 and walk comfortably along the catwalk 116 without stooping.

Portions of the lower runs 118 immediately beneath the catwalk 116 have an interior height H5, which is less than the maximum height H2 of the remaining portions of the runs 118, and the catwalk 116 is supported above these lower portions to provide the desired headroom H4 above the catwalk 116. Accordingly, upper runs 150 are accessed from the catwalk 116 by stepping up into the runs 150 from the catwalk 116. In an exemplary embodiment, the height difference between the catwalk 116 and the floors 156 of the upper runs 50 was approximately 15 inches.

While the present invention has been illustrated by the description of various embodiments thereof, and while the embodiments have been described in considerable detail, it is not intended to restrict or in any way limit the scope of the appended claims to such detail. For example, the double-row boarding system of FIG. 1 has been depicted as having 3 kennel runs in each of the upper and lower rows of runs, and the single-row boarding system of FIG. 9 has been depicted as having 4 upper and lower runs. It is understood, however, that the number of runs may be varied as desired. Indeed, the modular nature of the boarding systems 10, 110 readily permit such variation to conform to the space limitations of a given installation. Additional advantages and modifications will readily appear to those skilled in the art. The invention in its broader aspects is therefore not limited to the specific details, representative apparatus and methods and illustrative examples-shown and described. Accordingly, departures may be made from such details without departing from the scope or spirit of Applicant's general inventive concept.

What is claimed is:

1. A modular animal boarding system comprising:
   a lower section including at least one row of adjacent kennel runs, each lower run including a lower rear wall and a lower doorway opening outwardly of said rear wall;
   an upper section supported above said lower section, including at least one row of adjacent kennel runs, each upper run including an upper floor, an upper rear wall, and an upper doorway opening outwardly relative to said upper rear wall;
   said lower section and said upper section having a combined height which is less than or equal to about 12 feet;
   a catwalk supported above said lower section to provide treadable access to each of said upper runs, said catwalk being lower in height than at least a portion of said lower runs to provide a minimum desired headroom above said catwalk; and
   a plumbing system through which the user may wash-out animal waste, each of said lower runs and upper runs being in fluid communication with said plumbing system, said plumbing system being adaptable for installation in any desired facility having access to a suitable waste collection system.

2. The boarding system of claim 1, wherein said upper doorways open in a direction opposite said lower doorways.

3. The boarding system of claim 1, wherein said upper doorways open in the same direction as said lower doorways.

4. The boarding system of claim 1, wherein said lower section and said upper section each include only a single row of kennel runs.

5. The boarding system of claim 4, wherein at least an entry portion of said run s of said lower section have a height which is less an or equal to about 75 inches and said runs of said upper section have a height which is less than or equal to about 60 inches.

6. The boarding system of claim 4, further comprising:
   a flip-up bench swingably mounted to at least one of said upper rear wall and said lower rear wall, said flip-up bench allowing the user to wash-out each of said lower and upper runs irrespective of the presence of the animal boarder.

7. The boarding system of claim 4, said plumbing system further comprising:
   a drain located proximate said upper rear wall of each said upper run into which the user may wash-out the boarder's waste;
   at least one feeder pipe in fluid communication with said drain into which the boarder's waste is washed, said feeder pipe sloping downwardly and away from said drain; and
   at least one drain pipe in fluid communication with said feeder pipe, wherein said drain pipe is in fluid communication with a suitable waste collection system.

8. The boarding system of claim 7, wherein a single drain pipe collects the waste from each of said upper sections.

9. The boarding system of claim 4, further comprising:
   a stair case to provide access for the user and the boarder to said catwalk and said upper runs.

10. A modular animal boarding system, comprising:
    a lower section subdivided into at least one oppositely disposed lower run pair, said lower run pair comprising a joint rear wall common to said lower run pair, and plural lower doorways opening outwardly relative to said joint rear wall, wherein a single said lower doorway is provided to a single said lower run;
    at least one upper section supported above said lower section, wherein each said upper section is subdivided into a plurality of upper runs, each said upper run comprising an upper floor and an upper doorway opening inwardly relative to said joint rear wall;
    said lower section and said upper section having a combined height which is less than or equal to about 12 feet;
    a catwalk supported above said lower section to provide treadable access to each of said upper runs, said catwalk being lower in height than at least a portion of said lower runs to provide a minimum desired headroom above said catwalk; and
    a plumbing system through which the user may wash-out animal waste, each of said lower runs and upper runs being in fluid communication with said plumbing system, said plumbing system being adaptable for installation in any desired facility having access to a suitable waste collection system.

11. The boarding system of claim 10, wherein at least an entry portion of said runs of said lower section have a height which is less than or equal to about 75 inches and said runs of said upper section have a height which is less than or equal to about 60 inches.

12. The boarding system of claim 10, further comprising:
   a flip-up bench swingably mounted to at least one of said upper rear wall and said lower rear wall, said flip-up bench allowing the user to wash-out each of said lower and upper runs irrespective of the presence of the animal boarder.

13. The boarding system of claim 10, said plumbing system further comprising:
   a drain located proximate said upper rear wall of each said upper run into which the user may wash-out the boarder's waste;
   at least one feeder pipe in fluid communication with said drain into which the boarder's waste is washed, said feeder pipe sloping downwardly and away from said upper rear wall towards said joint rear wall of said lower section; and
   at least one drain pipe in fluid communication with said feeder pipe, wherein said drain pipe is in fluid communication with a suitable waste collection system.

14. The boarding system of claim 13, wherein a single drain pipe collects the waste from each of said upper sections.

15. The boarding system of claim 10, further comprising:
   a stair case to provide access for the user and the boarder to said catwalk and said upper runs.

16. An animal boarding system, comprising:
   a lower section subdivided into a plurality of oppositely disposed lower run pairs, said lower run pairs comprising a joint rear wall common to said lower run pairs and plural lower doorways opening outwardly relative to said joint rear wall, wherein a single said lower doorway is provided to a single said lower run;
   at least one upper section supported above said lower section, wherein each said upper section is subdivided into a plurality of upper runs, each said upper run comprising an upper doorway opening inwardly relative to said joint rear wall, an upper wall, and an upper floor;
   said lower section and said upper section having a combined height which is less than or equal to about 12 feet;
   a support frame to support said upper section above said lower section;
   a flip-up bench swingably mounted to each said upper rear wall and each said lower rear wall, said flip-up bench allowing the user to wash-out each of said lower and upper runs regardless of the presence of the boarder;
   a catwalk supported above said lower section and having a height which is less than the height of at least a portion of said lower runs to provide a minimum desired headroom above said catwalk;
   a staircase to provide access to said catwalk, said staircase including a landing plate having a landing plate drain; and
   a plumbing system through which a user may wash-out the boarder's waste, each of said lower runs and upper runs being in fluid communication with at least a portion of said plumbing system, said plumbing system comprised of a drain located proximate said upper rear wall of each said upper run into which the user may wash-out the boarder's waste, at least one feeder pipe in fluid communication with said drain into which the boarder's waste is washed, said feeder pipe sloping downwardly and away from said drain towards said joint rear wall of said lower section, a single drain pipe in fluid communication with said feeder pipe, said drain pipe being in joint fluid communication with each of said upper sections and said landing plate drain, and a floor gutter into which the waste from said upper and lower runs is washed, said plumbing system being adaptable for installation into any desired facility having access to a suitable waste collection system.

17. A modular animal boarding system, comprising:
   a lower section subdivided into at least one oppositely disposed lower run pair, said lower run pair comprising juxtapositioned rear walls, and plural lower doorways opening outwardly relative to said juxtapositioned rear walls, wherein a single said lower doorway is provided to a single said lower run;
   at least one upper section supported above said lower section, wherein each said upper section is subdivided into a plurality of upper runs, each said upper run comprising an upper floor and an upper doorway opening inwardly relative to said outwardly opening doorways of said lower run pair;
   said lower section and said upper section having a combined height which is less than or equal to about 12 feet;
   a catwalk supported above said lower section to provide treadable access to each of said upper runs, said catwalk having a height which is less than the height of at least a portion of said lower runs to provide a minimum desired headroom above said catwalk; and
   a plumbing system through which the user may wash-out animal waste, each of said lower runs and upper runs being in fluid communication with said plumbing system.

* * * * *

UNITED STATES PATENT AND TRADEMARK OFFICE
CERTIFICATE OF CORRECTION

PATENT NO.    : 6,568,350 B1
DATED         : May 27, 2003
INVENTOR(S)   : Savard et al.

It is certified that error appears in the above-identified patent and that said Letters Patent is hereby corrected as shown below:

Column 3,
Line 14, "locateable" should be -- locatable --.
Line 30, "view of taken" should be -- view taken --.
Line 59, "referenced" should be -- reference --.

Column 4,
Line 14, "rear, walls" should be -- rear walls --.
Line 33, "sides" should be -- side --.
Line 54, "52" should be -- 52, --.

Column 5,
Line 35, "the-catwalk" should be -- the catwalk --.

Column 7,
Line 23, "50" should be -- 150 --.
Line 40, "examples-shown" should be -- examples shown --.
Line 42, "Applicant's" should be -- Applicants' --.

Signed and Sealed this

Seventh Day of October, 2003

JAMES E. ROGAN
*Director of the United States Patent and Trademark Office*